United States Patent [19]
Ervin

[11] 3,830,048
[45] Aug. 20, 1974

[54] ROTARY CUTTER UNIT FOR GRAPE HARVESTERS

[76] Inventor: Jimmie D. Ervin, 3724 Stansiland St., Riverbank, Calif. 95367

[22] Filed: Aug. 31, 1973

[21] Appl. No.: 393,562

[52] U.S. Cl.............. 56/331, 56/27.5, 56/126, 56/330
[51] Int. Cl............................................ A01g 19/00
[58] Field of Search.......... 56/330, 331, 328 R, 504, 56/500, 126, 130, 27.5, 7

[56] References Cited
UNITED STATES PATENTS

| | | | |
|---|---|---|---|
| 1,435,752 | 11/1922 | Stiffler et al.......................... | 56/500 |
| 1,945,733 | 2/1934 | Court.................................... | 56/500 |
| 2,641,888 | 6/1953 | Grether................................ | 56/130 |
| 2,874,528 | 2/1959 | Esch..................................... | 56/126 |
| 3,210,921 | 10/1965 | Middlesworth et al........... | 56/328 R |
| 3,646,741 | 3/1972 | Edwards et al................... | 56/328 R |

Primary Examiner—Louis G. Mancene
Assistant Examiner—J. N. Eskovitz
Attorney, Agent, or Firm—Roger B. Webster

[57] ABSTRACT

A rotary cutter unit, for a self-propelled grape harvester of vine row-straddling type, operative upon advance of the harvester to sever the grape bunches from the canes of the grape vines in a row thereof; the cutter unit comprising a plurality of driven, conical, forwardly facing, vine-combing reels of open construction, and each such reel including a plurality of separate, axially spaced, forwardly tapering, helical sweep rods each having cutters on the inner side thereof whereby, as the reels comb through the vines and the canes are engaged by the helical sweep rods, the grape bunches drape over such rods and are severed by the cutters thereon.

7 Claims, 8 Drawing Figures

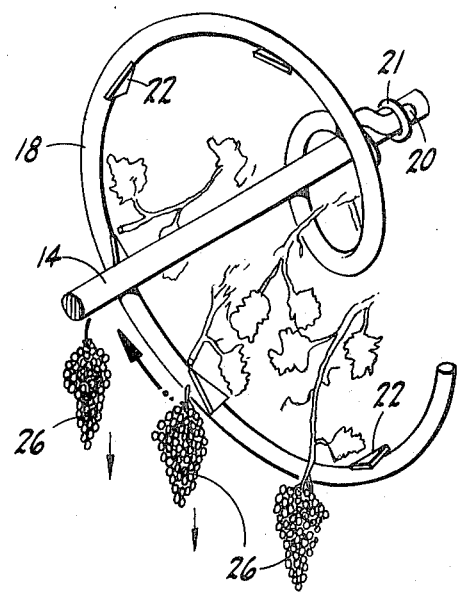
FIG.-4
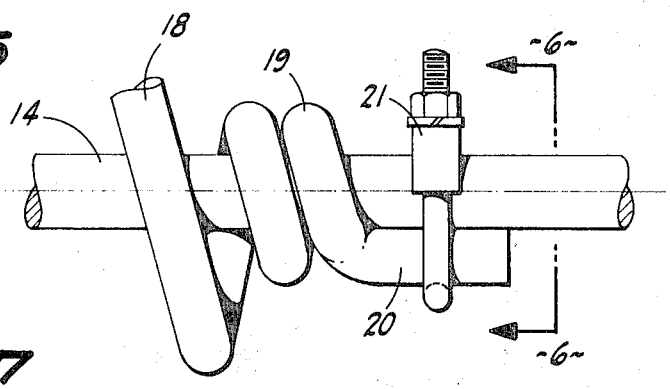
FIG.-5
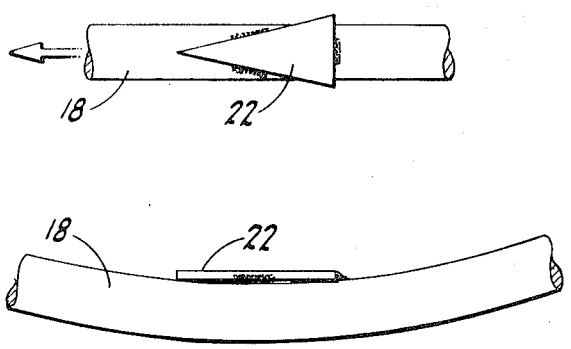
FIG.-7
FIG.-8
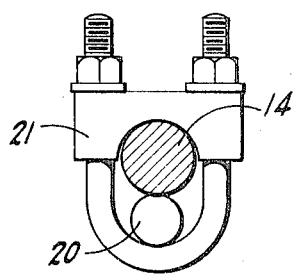
FIG.-6

ROTARY CUTTER UNIT FOR GRAPE HARVESTERS

BACKGROUND OF THE INVENTION

In vine row-straddling type grape harvesters, certain problems have been encountered in the mechanisms employed to sever the grape bunches from the canes of the vines. The present invention was conceived in a successful effort to meet such problems.

SUMMARY OF THE INVENTION

The present invention provides, as an important object, a novel rotary cutter unit in a grape harvester of row-straddling type; the cutter unit comprising a plurality of driven, conical, forwardly facing, vine-combing reels of open construction, and each such reel including a plurality of separate, axially spaced, forwardly tapering, helical sweep rods each having cutters on the inner side thereof whereby, as the harvester advances along a vine row and the reels comb through the vines and the canes are engaged by the helical sweep rods, the grape bunches drape over such rods and are severed by the cutter thereon. The harvester, as usual, includes a suitable deflector arrangement and carry-off conveyors which receive the severed grape bunches.

The present invention provides, as another important object, a rotary cutter unit, as in the preceding paragraph, in which each reel includes a driven, central or axial shaft, and the separate, helical sweep rods of the reel are mounted on such shaft in axially spaced but adjustable relation whereby such spacing of the sweep rods, and consequently the axial extent of each reel, can be varied as working conditions may require.

The present invention provides, as a further object, a rotary cutter unit for grape harvesters which is designed for ease and economy of manufacture.

The present invention provides, as a still further object, a practical, reliable, and durable rotary cutter unit for grape harvesters, and one which is exceedingly effective for the purpose for which it is designed.

BRIEF DESCRIPTION OF THE DRAWINGS

FIG. 4 is an enlarged, somewhat diagrammatic, fragmentary view of one of the cane-engaging sweep rods in operation.

FIG. 5 is an enlarged fragmentary view showing the manner of mounting each sweep rod on the related reel shaft.

FIG. 6 is a cross section on line 6—6 of FIG. 5.

FIG. 7 is an enlarged fragmentary plan view of one of the cutters employed on the sweep rods.

FIG. 8 is a side elevation of such cutter.

DESCRIPTION OF THE PREFERRED EMBODIMENT

Figure 1:
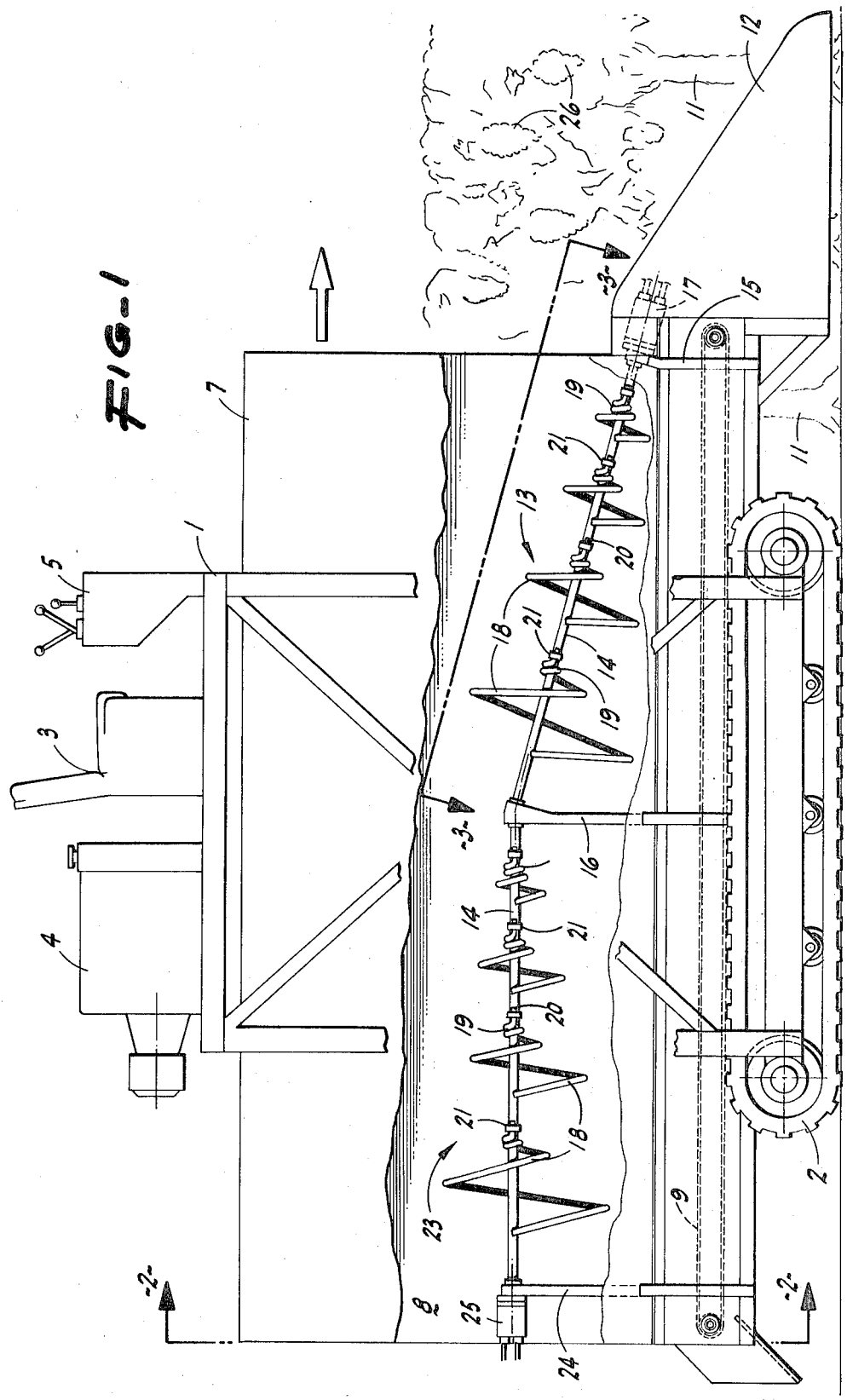
FIG. 1 is a side elevation of a grape harvester embodying the rotary cutter unit; the harvester being mainly in outline and partly broken away.
Figure 2:
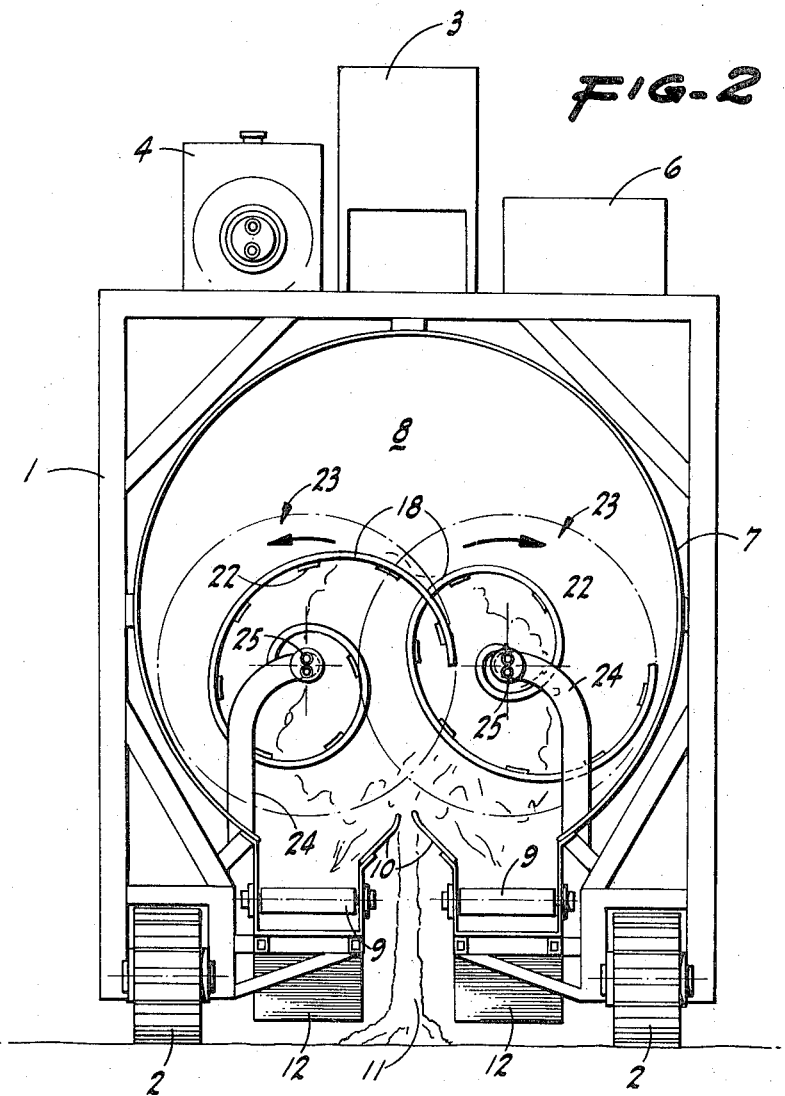
FIG. 2 is a rear end elevation taken substantially on line 2—2 of FIG. 1.
Figure 3:
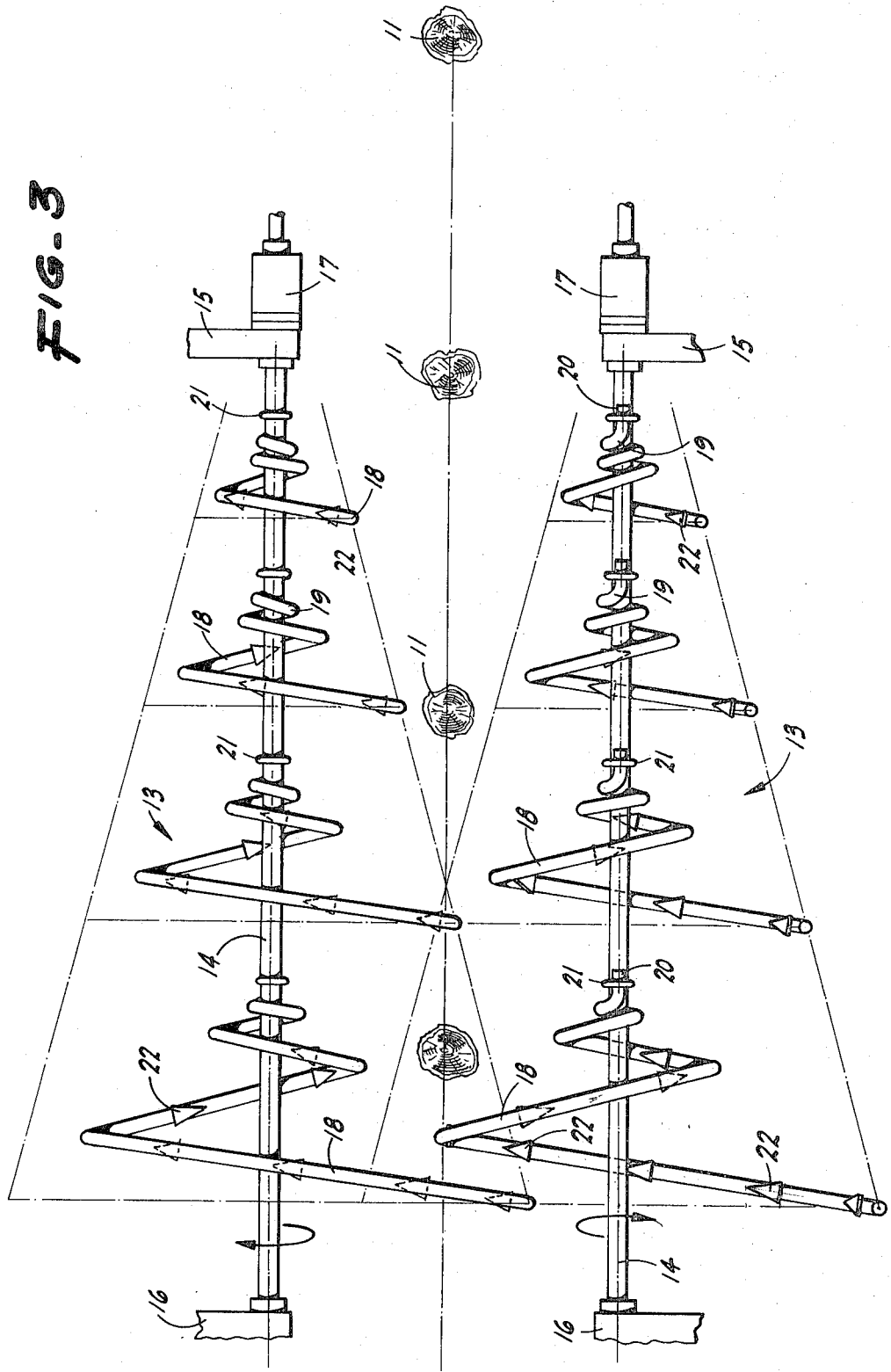
FIG. 3 is an enlarged fragmentary plan view taken substantially on line 3—3 of FIG. 1.

Referring now more particularly to the drawings and to the characters of reference marked thereon, the rotary cutter unit of the present invention is here shown as embodied—by way of example—in a self-propelled, grape vine row-straddling type harvester which includes an inverted U-shaped main frame 1 supported at the sides by endless or crawler track units 2 driven by hydraulic motors (not shown). On top thereof, the main frame 1 supports an operator's seat 3, a motor and hydraulic pump unit 4, a console 5 (for control levers) ahead of seat 3, and a housing 6 for required hydraulic flow-regulating equipment; all of the essential operating or power devices of the harvester being hydraulic motors responsive to such equipment.

The main frame 1 is provided, except at the bottom, with a lining 7 which defines a longitudinal, open-ended tunnel 8; the bottom of such tunnel being defined by transversely spaced, longitudinally extending, endless carry-off conveyors 9; the space between such conveyors being normally closed by longitudinal, flexible deflectors 10 which extend at an upward incline from the conveyors 9 to a central line of normal engagement. The deflectors, being flexible, permit the relative passage therebetween of the trunks 11 of the vines of the row along which the harvester advances in straddling relation.

At the front end thereof, the main frame supports a pair of rigidly mounted, transversely spaced, forwardly projecting lifters 12 adapted to run beneath and lift the relatively long canes on opposite sides of the vines (trained on wires between posts) as the harvester advances, and to dispose such canes a distance aboveground for engagement by the rotary cutter unit of the present invention. Such rotary cutter unit comprises the following:

A pair of driven, conical, forwardly facing, vine-combing reels, indicated generally at 13, of open helical construction (as hereinafter described) are rotatably mounted in the front portion of the tunnel 8 in the main frame 1 in longitudinally extending, transversely spaced relation; such reels 13 being disposed at a forward and downward incline.

Each such reel 13 comprises a central or axial shaft 14 journaled on and supported by a front post 15 and a rear post 16; the posts 15 and 16 being fixed on the main frame 1. The shaft 14 is driven by an end-mounted hydraulic motor 17. A plurality of separate, axially spaced, forwardly tapering, helical sweep rods 18 (which define the convolutions of the reel) are axially secured on and encompass the shaft 14. Such helical sweep rods 18, in rearward progression from the foremost one, increase in maximum working diameter as shown; this imparting to the reel 13 its conical form, and assuring of maximum efficiency in the operation thereof.

The helical sweep rods 18, of each reel 13, are coiled, as at 19, at the small or lead end, and these coils engage with a snug but initially sliding fit on the shaft 14. A finger 20 extends from the coils 19 and is firmly but releasably secured to the shaft 14 by a clamp 21. See FIGS. 5 and 6. In this fashion, the sweep rods 18 are normally fixed on the related shaft but can be released and adjusted therealong as working conditions may require.

A plurality of cutters 22, of elongated triangular shape and sharpened on the leading edge relative to the indicated direction of rotation, are fixed in circumferentially spaced relation on the inner side of the sweep rods 18 of each reel 13.

The reels 13—and consequently the sweep rods 18—are rotated in a direction to turn laterally outwardly at the top. In other words, the pair of reels 13 are rotated to turn away from each other at the top of such reels.

Another pair of driven, conical, forwardly facing, vine-combing reels, indicated generally at 23, are rotatably mounted in the rear portion of the tunnel 8 in the main frame 1 in longitudinally extending, transversely spaced relation; such reels 23 being horizontally disposed.

The reels 23 are of substantially the same construction as reels 13; each reel 23 thus including a central or axial shaft 14 having mounted thereon a plurality of separate, axially spaced, forwardly tapering sweep rods 18 which encompass the shaft 14.

The shaft 14 of each reel 23 is journaled at its front end on and supported by the related post 16, while at the rear end such shaft 14 is journaled on and supported by a post 24. Each shaft 14 is driven by an end-mounted hydraulic motor 25.

Upon advance of the harvester, with a grape vine row relatively passing through the tunnel 8, the lifters 12 engage and elevate the elongated grape bunch-bearing canes of such vines.

Upon the canes being so elevated, the rotating reels 13 comb—on each side of the vine row—through the array of such canes, with the rotating helical sweep rods 18 progressively encountering and engaging said canes. As this occurs, the grape bunches 26 drape over one or another of the sweep rods 18, are severed by the cutters 22, and thence gravitate downward for reception on the carry-off conveyors 9.

After the grape vine canes are encountered and combed by the forward pair of reels 13 with the sweep rods 18 and cutters 22 thereof functioning as above described, such canes are encountered and combed by the rear pair of reels 23; the cutters 22 of the sweep rods 18 of said rear reels 23 severing grape bunches 26 which may have escaped to reels 13. The grape bunches 26 severed by the reels 23 are likewise received on the carry-off conveyors 9.

In order to assure that the pairs of reels comb through essentially all the canes of the vines, with a minimum of grape bunches remaining unsevered, the reels of each pair thereof (i.e., the reels 13—13 and the reels 23—23) are dimensioned and disposed so that—at their maximum working diameters (determined by the rearmost sweep rods 18)—they lap each other. The rearmost sweep rods 18 of the reels of each pair are timed so as to not encounter or obstruct each other, and additionally are sufficiently resilient (being made of spring rods) to yield if a vine trunk 11 (or adjacent supporting post) is engaged.

From the foregoing description, it will be readily seen that there has been produced such a rotary cutter unit for grape harvesters as substantially fulfills the objects of the invention, as set forth herein.

While this specification sets forth in detail the present and preferred construction of the rotary cutter unit for grape harvesters, still in practice such deviations from such detail may be resorted to as do not form a departure from the spirit of the invention as defined by the appended claims.

I claim:

1. A rotary cutter unit, for a mobile grape harvester of vine row-straddling type, comprising a main frame supported for movement along a vine row, a pair of driven vine-combing reels, the reels being of open helical form, conical, and facing forwardly, means mounting the reels on the main frame in position to work on opposite sides of the row in engagement with canes of the vines in said row, and cutters on the reels adapted to sever grape bunches from canes engaged by the reels as the latter rotate and comb with auger-like action through the vines upon advance of the harvester; the reels being driven to individually turn laterally outwardly at the top.

2. A rotary cutter unit, as in claim 1, including another pair of driven vine-combing reels, said other pair of reels being disposed rearward of said first-named pair of reels in corresponding relation, said other reels being of open helical form, conical, and facing forwardly, means mounting said other pair of reels on the main frame to work on opposite sides of the row in engagement with canes of the vines in said row subsequent to combing of the vines by said first-named pair of reels, and cutters on said other pair of reels adapted to sever remaining grape bunches from the canes engaged by said last-named reels as the latter rotate and comb with auger-like action through the vines rearwardly of said first-named reels; said other reels being driven to individually turn laterally outwardly at the top.

3. A rotary cutter unit, for a mobile grape harvester of vine row-straddling type, comprising a main frame supported for movement along a vine row, a pair of driven vine-combing reels, means mounting the reels on the main frame in position to work on opposite sides of the row in engagement with canes of the vines in said row, and cutters on the reels adapted to sever grape bunches from canes engaged by the reels as the latter rotate and comb through the vines upon advance of the harvester; the reels being axially elongated, conical, facing forwardly, and include helical convolutions, the cutters being secured to such convolutions.

4. A rotary cutter unit, for a mobile grape harvester of vine row-straddling type, comprising a main frame supported for movement along a vine row, a pair of driven vine-combing reels, means mounting the reels on the main frame in position to work on opposite sides of the row in engagement with canes of the vines in said row, and cutters on the reels adapted to sever grape bunches from canes engaged by the reels as the latter rotate and comb through the vines upon advance of the harvester; the reels being axially elongated, conical, and facing forwardly; each reel including a plurality of axially spaced, helical sweep rods, and the cutters being secured to such sweep rods.

5. A rotary cutter unit, as in claim 4, in which each reel includes a central shaft; the helical sweep rods being individually separate, and means securing such separate sweep rods on the central shaft.

6. A rotary cutter unit, as in claim 5, in which each helical sweep rod tapers forwardly.

7. A rotary cutter unit, as in claim 4, in which the helical sweep rods of each reel, in rearward progression from the foremost sweep rod, increase in maximum working diameter so as to impart to such reel its conical form.

* * * * *